US008806519B2

(12) United States Patent
Scellato et al.

(10) Patent No.: US 8,806,519 B2
(45) Date of Patent: Aug. 12, 2014

(54) METHOD TO EVALUATE THE GEOGRAPHIC POPULARITY OF GEOGRAPHICALLY LOCATED USER-GENERATED CONTENT ITEMS

(75) Inventors: Salvatore Scellato, Cambridge (GB); Mirjam Wattenhofer, Gockhausen (CH); Anders Torp Brodersen, Wadenswill (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/358,982

(22) Filed: Jan. 26, 2012

(65) Prior Publication Data

US 2013/0111512 A1    May 2, 2013

Related U.S. Application Data

(60) Provisional application No. 61/553,610, filed on Oct. 31, 2011.

(51) Int. Cl.
*H04N 21/442* (2011.01)

(52) U.S. Cl.
USPC .................................. 725/14; 725/11; 725/46

(58) Field of Classification Search
None
See application file for complete search history.

(56) References Cited

U.S. PATENT DOCUMENTS

| 8,204,977 | B1 | 6/2012 | Brodersen et al. | |
|---|---|---|---|---|
| 2007/0214097 | A1 | 9/2007 | Parsons et al. | |
| 2009/0030899 | A1* | 1/2009 | Tareen et al. | 707/5 |
| 2010/0058405 | A1* | 3/2010 | Ramakrishnan et al. | 725/97 |
| 2011/0083101 | A1* | 4/2011 | Sharon et al. | 715/800 |

OTHER PUBLICATIONS

Michael Batty, Spatial Entropy, published Sep. 3, 2010, Wiley Online Library, vol. 6, Issue 1, pp. 1-31, Jan. 1974, retrieved from internet <http://onlinelibrary.wiley.com/doi/10.1111/j.1538-4632.1974.tb01014.x/abstract , select Get PDF (1196K), retreived on Feb. 14, 2013.*
Scellato et al., "Track Globally, Deliver Locally: Improving Content Delivery Networks by Tracking Geographic Social Cascades", Presented at the World Wide Web Conference, Mar. 28-Apr. 1, 2011 (WWW 2011), pp. 457-466, https://cs.uwaterloo.ca/~kdaudjee/courses/cs848/papers/scellato11.pdf.
Paszto et al, "On Spatial Entrophy in Geographical Data", In: GIS Ostrava, Jan. 25-28, 2009, http://gis.vsb/cz/GIS_Ostrava/GIS_Ova_2009/sbornki/Lists/Papers/017.pdf.
Brodersen et al., "YouTube Around the World: Geographic Popularity of Videos", Presented at the World Wide Web Conference, Apr. 16-20, 2012 (WWW 2012), http://www2012.org/proceedings/proceedings/p241.pdf.
International Search Report and Written Opinion of the International Searching Authority for International Patent Application No. PCT/US12/62852 mailed Jan. 22, 2013.

* cited by examiner

*Primary Examiner* — Nasser Goodarzi
*Assistant Examiner* — Adil Ocak
(74) *Attorney, Agent, or Firm* — Lowenstein Sandler LLP

(57) ABSTRACT

A mechanism to evaluate the geographic popularity of geographically-located user-generated content is presented. A method to evaluate the geographic popularity of geographically-located user-generated content includes receiving a user-generated content item having metadata indicating a geographic location of the user-generated content item, determining geographic location metadata of each of a plurality of views of the content item, calculating a view geographic entropy of the content item by dividing the plurality of views across multiple geographic regions while taking into account the geographic location of the content item, and providing the calculated view geographic entropy of the content item for presentation in a visual display that is part of an analytical report of the content item.

20 Claims, 8 Drawing Sheets

Content Trends - Browse
Geographic Area ▽ — 201
All Ages ▽ — 202
All Genders ▽ — 203
Results — 205
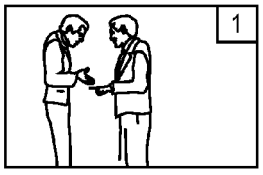
Video 1 Title
by video 1 owner
412,800 views
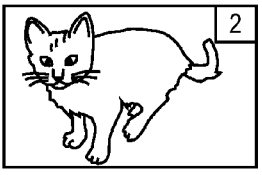
Video 2 Title
by video 2 owner
372,734 views
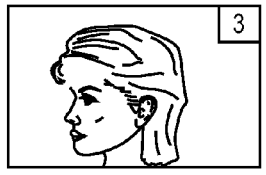
Video 3 Title
by video 3 owner
2,429,688 views
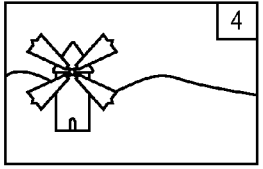
Video 4 Title
by video 4 owner
7,038,041 views
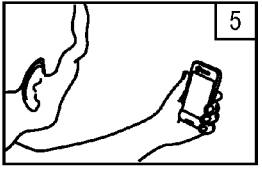
Video 5 Title
by video 5 owner
614,762 views
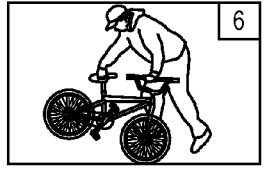
Video 6 Title
by video 6 owner
1,366,822 views
FIG. 2A

500

Receive request to compare geographic popularity for a plurality of content items, where the request indicates one or more geographic areas to consider
510

Retrieve view geographic entropy metric data for all content items
520

For each of the one or more geographic areas, rank each content item according to its view geographic entropy metric for that geographic area
530

Return ranking result for display in a UI
540

FIGURE 5

METHOD TO EVALUATE THE GEOGRAPHIC POPULARITY OF GEOGRAPHICALLY LOCATED USER-GENERATED CONTENT ITEMS

RELATED APPLICATIONS

This patent application claims the benefit under 35 U.S.C. §119(e) of U.S. Provisional Application No. 61/553,610, filed Oct. 31, 2011, which is herein incorporated by reference.

TECHNICAL FIELD

Embodiments of the present invention relate to the field of shared content hosting platforms and, more particularly, to a mechanism to evaluate the geographic popularity of geographically-located user-generated content.

BACKGROUND

Historically, media content was distributed to users via large media organizations (e.g., TV Channels, newspaper, etc.) that often segmented users in regional markets, releasing new content in a controlled way. Hence, video popularity was seldom a global phenomenon, as users could not access the same content all over the world. With the advent of online video sharing platforms, these regional barriers have been removed, making all content items accessible from all over the globe.

Research has shown that video popularity on video sharing platforms exhibit a "long-tail" behavior, where some videos are able to accumulate hundreds of millions of views, whereas the vast majority can only attract a few views. However, this unbalanced skew of video popularity serves a purpose: users are able to discover and enjoy millions of videos about niche topics in which they are interested, even though each individual video might not accrue a large number of overall views.

Geographic relevance of a video may be a powerful factor impacting video popularity. For instance, topics like sports, politics, and news tend to have a spatial focus of interest. In addition, language and culture also tend to constrain the propagation of videos to a global audience. As such, the geographic scope of a video might well be constrained to web users in a limited geographic region. Furthermore, geographic locality also has an impact on systems and infrastructure. Understanding how and where users watch videos on video sharing platforms is useful across several domains, such as building predictive modules of user interest and recommending systems. In a similar way, geographic locality can impact geographically distributed content delivery systems and data centers.

Some video sharing platforms have provided technology that allows users of the video sharing platform to see video views broken down by country. However, these technologies do not take into consideration the geographic location attached to the video itself or the popularity of the video locally versus globally.

SUMMARY

In one embodiment, a mechanism to evaluate the geographic popularity of geographically-located user-generated content is presented. A method of embodiments of the invention includes receiving a user-generated content item having metadata indicating a geographic location of the user-generated content item and determining geographic location metadata of each of a plurality of views of the content item. The method further includes calculating a view geographic entropy of the content item by dividing the plurality of views across multiple geographic regions while taking into account the geographic location of the content item. Lastly, the method includes providing the calculated view geographic entropy of the content item for presentation in a visual display that is part of an analytical report of the content item.

In another embodiment of the invention, the view geographic entropy of the content item is equal to $-\Sigma_i(v_i/V) \log(v_i/V*d_i))$, where $v_i$ is a number of views received in a particular region i, V is a total number of views for the content item overall, and $d_i$ is a distance between the geographic location of the content item and a location of a geographic region associated with the number of views in $v_i$. Furthermore, the view geographic entropy may be used to classify the content item on a scale that ranges from a highly global content item to a highly local content item, where highly global indicates the content item has a consistent popularity through multiple geographic regions and highly local indicates the content item has a high popularity in a single geographic region.

In additional embodiments, computing devices for performing the operations of the above described embodiments are also implemented. Additionally, in embodiments of the invention, a computer readable storage media stores methods for performing the operations of the above described embodiments.

BRIEF DESCRIPTION OF THE DRAWINGS

The present invention will be understood more fully from the detailed description given below and from the accompanying drawings of various embodiments of the invention.

FIGS. 2A and 2B illustrate a trends graphical user interface (GUI) presented to a user, in accordance with one embodiment of the present invention.

FIG. 5 is a flow diagram illustrating another embodiment for a method of comparing geographic popularity of geographically-located user-generated content.

DETAILED DESCRIPTION

A mechanism to evaluate the geographic popularity of geographically-located user-generated content is described. User-generated content items experience a wide range of popularity when shared via an online sharing platform, with requests sometimes coming from all over the world. Often times, a geographic location is attached to the user-generated content items. Embodiments of the invention present a system and methods to evaluate the geographic popularity of these user-generated content items in order to provide additional analytics about the content items when sharing these items on a shared content hosting platform.

A method to evaluate the geographic popularity of geographically-located user-generated content according to an embodiment of the invention includes receiving a user-generated content item having metadata that indicates a geographic location of the user-generate content item. The method then determines geographic location metadata for each view of the content item. Then, the method calculates a view geographic entropy metric of the content item. The view geographic entropy metric is calculated by dividing the views of the content item across multiple geographic regions, while taking into account the geographic location of the content item. Lastly, the method provides the calculated view geographic entropy of the content item for presentation in a visual display. In some embodiments, the visual display is part of an analytical report of the content item presented to an end user of a shared content hosting platform via a user interface (UI).

When describing some embodiments of the invention, user-generated content is referred to in terms of videos. However, embodiments of the invention are also equally applicable to other types of user-generated content such as photos, documents, music, and any other type of media a user may generate.

Figure 1:
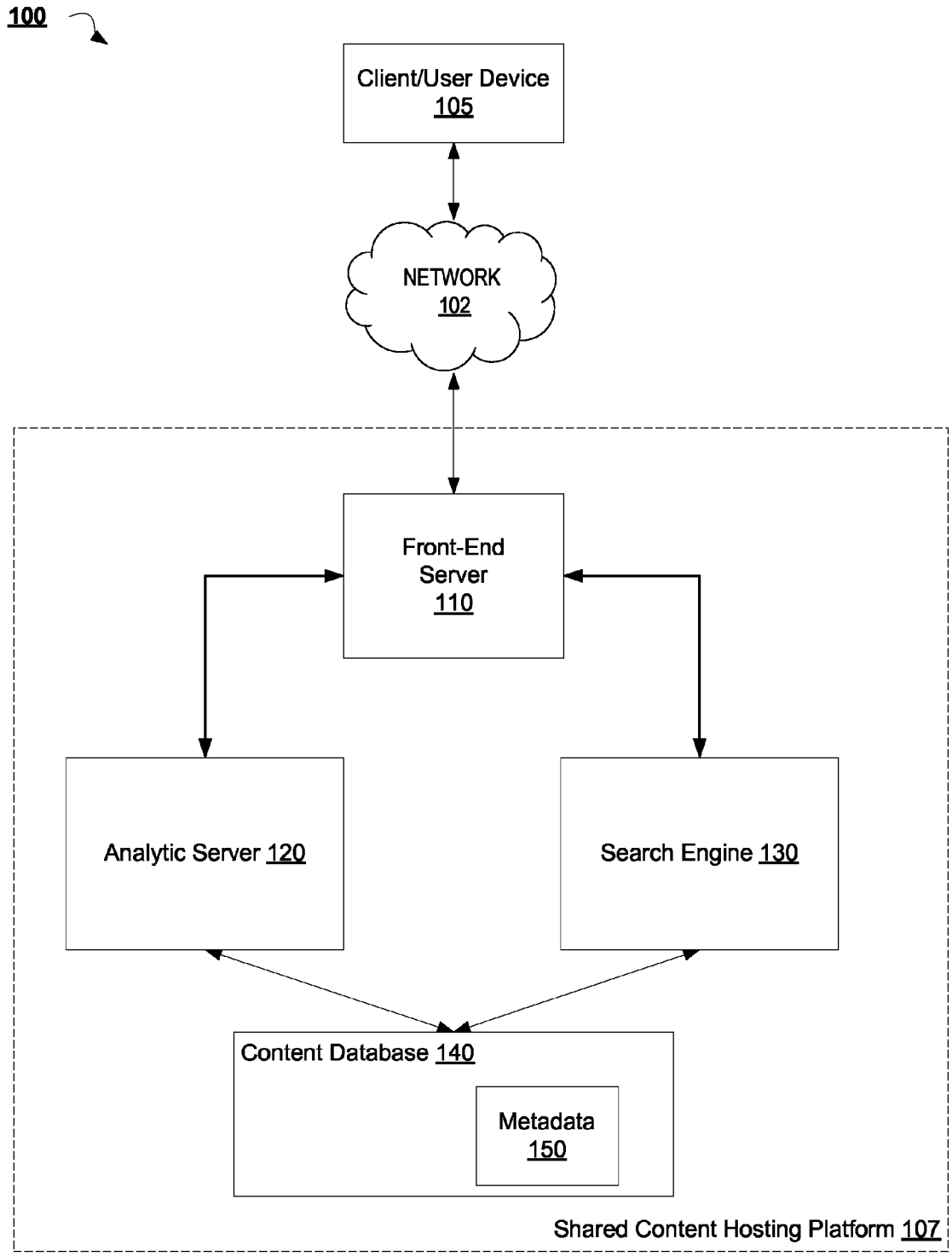
FIG. 1 illustrates an exemplary system architecture, in accordance with one embodiment of the present invention.

FIG. 1 illustrates an exemplary system architecture 100, in accordance with one embodiment of the present invention. System 100 comprises a shared content hosting platform 107 including front-end server 110, an analytic server 120, a search engine 130, and a content database 140. In addition, one or more client/user devices 105 are in communication over a network 102 with the shared content hosting platform 107 via front-end server 110. The network 102 may comprise the Internet in one embodiment. In other embodiments, other networks, wired and wireless, such as an intranet, local area network (LAN), wide area network (WAN), cellular network or broadcast network may be used.

The client/user device 105 may be any type of computing device, for example, a device including a processor, a computer-readable medium, and a memory. In some embodiments, the client/user device 105 may be executing a browser application or other application adapted to communicate over Internet-related protocols (e.g., TCP/IP and HTTP) and/or display a user interface. While only a single client/user device 105 is shown in FIG. 1, system 100 may support a large number of concurrent sessions with many client/user devices 105.

Moreover, embodiments of the invention may operate within a single server device or on multiple server devices. Although each of front-end server 110, analytic server 120, search engine 130, and content database 140 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of system 100, a user accesses shared content hosting platform 107 via client/user device 105 over network 102. The front-end server 110 receives communications from the client/user device 105, and processes and/or directs these communications accordingly. In one embodiment, the front-end server 110 comprises a processing device and a computer-readable memory.

Front-end server 110 is communicably coupled to analytic server 120 and search engine 130. Analytic server 120 and search engine 130 may be implemented in hardware, software, firmware, or any combination of the above. Front-end server 110, analytic server 120, and search engine 130 may operate in combination to provide a shared content hosting platform 107 to end users, such as a user utilizing client/user device 105. The end users may upload a variety of content to the shared content hosting platform 107 to share with other ends users via the shared content hosting platform.

In one embodiment, analytic server 120 provides geographic popularity statistics to front-end server 110 as part of a user interface (UI) displayed to a user of client/user device 105. In one embodiment, the user may request a particular user-generated content item from shared content hosting platform 107 via a Uniform Resource Locator (URL) link for that content item. In some embodiments, the URL may be directly entered by the user or the result of a search for the content item by the user. The request for the content item is then forwarded by front-end server 110 to search engine 130, which retrieves the requested content item from content database 140. In other embodiments, a user may directly utilize an analytic service of the shared content hosting platform 107.

The analytic service may provide a user detailed statistics about content items that the users queries to the analytic service. In one embodiment, analytic server 120 provides the operations and functions for the analytic service of shared content hosting platform 107. In one embodiment, the shared content hosting platform 107 notifies users of the types of information that are stored by the shared content hosting platform 107 and analyzed by analytic server 120, and provides the user the opportunity to opt-out of having such information collected and/or shared with the server.

Once a content item is retrieved via search engine 120 or via an analytic service user request, the analytic server 120 may perform various assessments of metadata 150 associated with the retrieved content to create detailed statistics regarding the content. In one embodiment, analytic server 120 performs an assessment of the user-generated content metadata 150 to determine the geographic popularity of the content with regard to the geographic location of the content.

In one embodiment, the metadata 150 of a content item stored in content database 140 includes a geographic location of the content item. The geographic location may include where the item was created, where the item was uploaded, and/or the location of the content depicted in the item. In one embodiment, the geographic location may be directly provided by the user uploading the content item. In other embodiments, the geographic location may be inferred by the Internet Protocol (IP) address of the user when they uploaded the content item.

In addition to the geographic location of the item, each content item also has associated view history data. The view history data may include, for each view of the content item, a time and date of a view of the content item, an IP address associated with the view, a duration of the view, and other view data as relevant to the type of content item. For instance, if the content item is a video, then the view data may include any time markers within the content item where the viewer paused, rewound, or forwarded the video, as authorized by the user. The view data could also include time markers indicating when the viewer closed out of the content item. In one embodiment, the view history data may be stored with the metadata 150 associated with the content item. In another embodiment, view history data for content items are kept in storage separate from the content and its associated metadata.

In embodiments of the invention, the geographic location data of a content item and the view history data of the content item are utilized by the analytic server 120 to determine the geographic popularity of the content with regard to the geographic location of the content. Using this data, for any content item, it is possible to define measures that summarize whether requests are coming from locations close to the item itself or from further away. Embodiments of the invention consider how the view requests for the content item can be divided across spatial regions, in order to take into account the geographic distance between those regions and the location of the content item itself.

For example, consider two separate content items, both with geographic location metadata placing them in New York City. Assume Item 1 receives 20 views from Boston and 80 views from Los Angeles (as determined from the view history data of that content item). Further assume that Item 2 receives 50 views from New York City, 40 views from Boston, 5 views from London, and 5 views from Paris. Each item receives the same number of total views (100), but varies greatly in the geographic dispersion of these views. The analytic server 120 of embodiments of the invention may associate measures to these two items to highlight that Item 2 receives more views from places nearby its geographic location, or that Item 1 receives views from a less geographically diverse set of locations.

Embodiments of the invention provide metrics that indicate whether a content item is popular in a confined geographic area or rather around the world, taking into account the item's geographic location. In order for the analytic server 120 to take into account spatial heterogeneities across content items generated in different locations, the measures of an individual content item may be compared with the average value of the same measures for items within a certain distance of the item itself.

The following description provides a listing of formulas that the analytic server 120 may apply to content item data, such as geographic location metadata and view history data, to determine the geographic measures utilized in embodiments of the invention.

i=geographic area (e.g., region, country, or city)
$v_i$=number of views in region i
$d_i$=distance between the geographic location of the item and the location of the geographic region i
$(v_1, v_2, v_3, \ldots, v_N)$=vector representing the view distribution of a content item
Total Views (V):

$$V=\Sigma_i v_i$$

The formula for Total Views, V, measures total number of views of a content item.
View Distance (D):

$$D=1/V\Sigma_i v_i * d_i$$

The formula for View Distance, D, measures the average distance between the view locations and the item location, which can generally represent how an item receives views from distant regions.
View Locality (L):

$$L=1/V\Sigma_i v_i/d_i$$

The formula for View Locality, L, measures how an item receives views from distant places by applying more weight to views coming from places nearby and less weight to views coming from distant regions.
View Entropy (H):

$$H=-\Sigma_i v_i/V \log (v_i/(V*d_i))$$

The formula for View Entropy, H, measures how views are spread across different regions, without considering the geographic location of the item.

View Geographic Entropy (G):

$$G=-\Sigma_i v_i/V \log (v_i/(V*d_i))$$

The formula for View Geographic Entropy, G, measures how views are spread across different regions, while taking into account the geographic location of the content item.

Figure 2B:
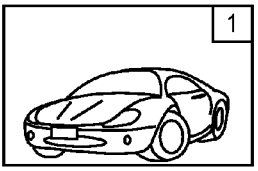
Figure 3:
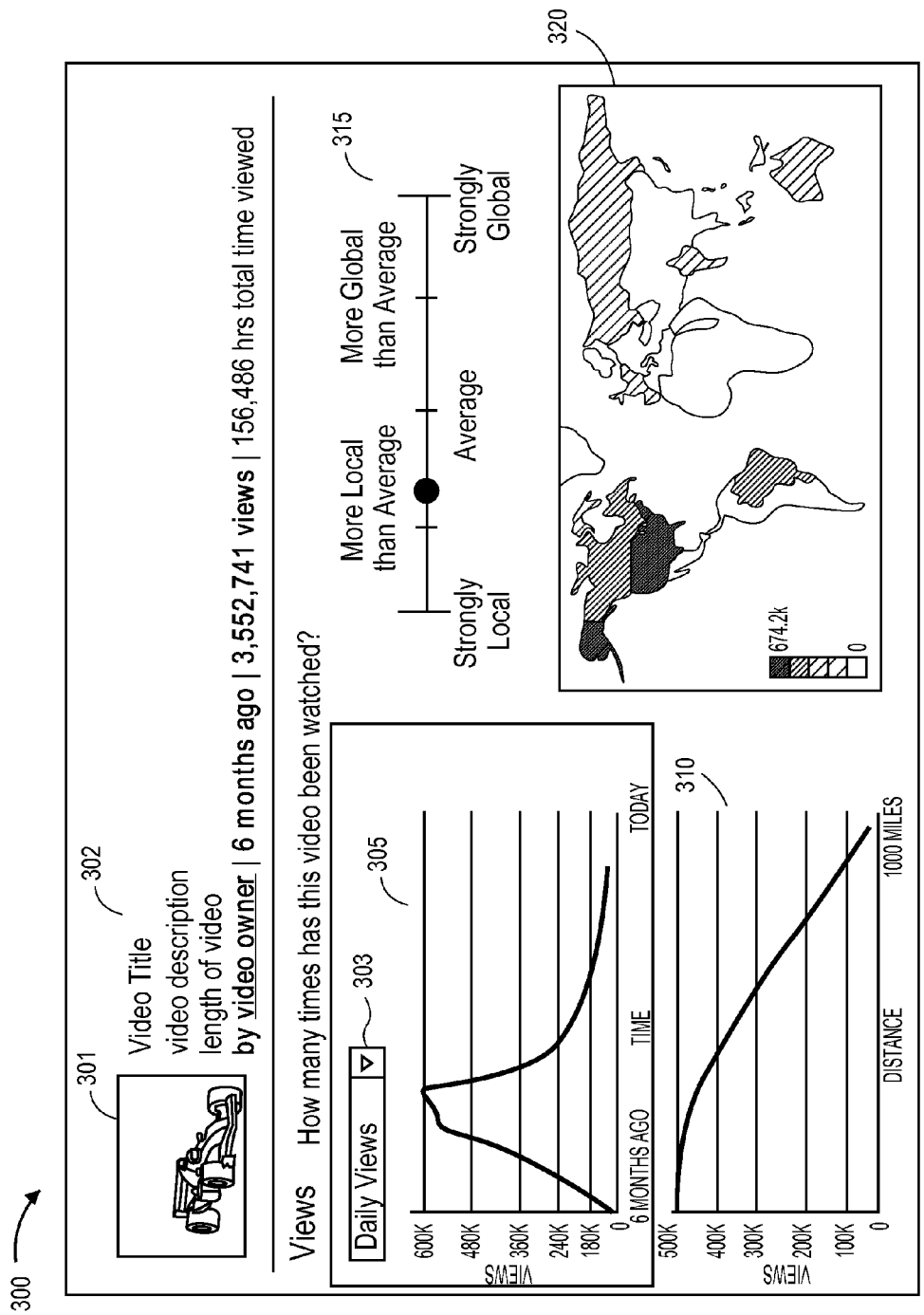
FIG. 3 illustrate an individual content item view GUI presented to a user, in accordance with another embodiment of the present invention.

Utilizing the above-described formulas, the analytic server 120 may determine a variety of metrics with regard to a content item's geographic diversity. In embodiments of the invention, the analytic server 120 may then provide these metrics to the front-end server to present to an end user in a variety of different formats. FIGS. 2A, 2B, and 3 depict exemplary UIs that utilize results based on the geographic measures of embodiments of the invention in order to present one or more content items to an end user.

For example, FIGS. 2A and 2B illustrate an exemplary trends UI 200 presented to an end user of shared content platform 107 via client/user device 105. FIG. 2A depicts a UI 200 that can be personalized to browse content items that are popular in different geographic areas. The user controls 201, 202, 203 in UI 200 include drop-down menus where a user may select different popularity profiling options, such as a preferred geographic location 201, and age range 202 and gender 203 if such data is available. Using these controls 201, 202, 203, an end user may select a specific location and demographic of interest to view content items 205 that are popular for these indicated areas. In embodiments of the invention, analytic server 120 may calculate the geographic entropy metric, G, for each content item in the shared content hosting platform 107, and then use the results of this calculation to narrow down potential candidates for the requested search provided in FIG. 2A.

FIG. 2B depicts a UI 200 that can be personalized to compare different groups of content items that are popular in different geographic areas. The user controls 205, 206, 207 in UI 200 include drop-down menus and selectable links where a user may indicate different popularity profile options, such as a preferred geographic location 201, age range 202, and gender 203. Using these controls 205, 206, 207, a user may select different geographic areas and demographics in order to compare content items 215, 216, 217 that are popular for these specific groups. In embodiments of the invention, analytic server 120 may calculate the geographic entropy metric, G, for each content item in the shared content hosting platform 107. Then, this calculated metric, G, is used to narrow down the content items to those that should be included in each group 215, 216, 217. The results of this filtering may then be displayed in a UI, such as UI 200 illustrated in FIG. 2B. As a result, an end user can compare content items that are locally popular in different geographic areas, without being shown the same globally popular content items for each geographic area.

FIG. 3 illustrates another exemplary UI 300 that depicts geographic popularity for an individual content item. UI 300 may be used to provide metrics to an end user that uploaded a content item or, as authorized by that end user, to a general administrator, managing user, or other user inquiring into the metrics of a content item. UI 300 depicts a thumbnail image 301 of the content item, a description 302 of the content item, which can include the title, short narrative, length of video, owner, upload date, total number of views, and total time viewed. Furthermore, UI 300 provides a variety of different graphs and charts to illustrate the different metrics that analytic server 120 can provide for the content item. For example, view graph 305 shows the daily views of the content item over the lifetime of the content item on the shared content hosting platform. Drop-down menu 303 allows a user to change the type of view depicting in graph 305, such as daily views, weekly views, monthly views, and so on.

In terms of geographic popularity, UI 300 provides graph 310 depicting the number of views as a function of distance from the geographic location of the content item. Similarly, map 320 provides a global view of the popularity of the video, providing different shading for geographic areas depending on the number of views in those areas. Lastly, scale 315 classifies the content item in terms of global versus local popularity. The depicted range of the scale flows from 'Strongly Local' to 'Strongly Global'. One skilled in the art will appreciate that other terms and descriptions may be utilized to depict the same concept. The geographic popularity formulas described above may be applied by analytic server 120 to produce the data underlying the graphs, chart, maps, and scales 305-320 provided in UI 300. One skilled in the art will appreciate that other illustrations and depictions of the metrics are possible and that embodiments of the invention are not limited to those provided in FIG. 3.

Figure 4:
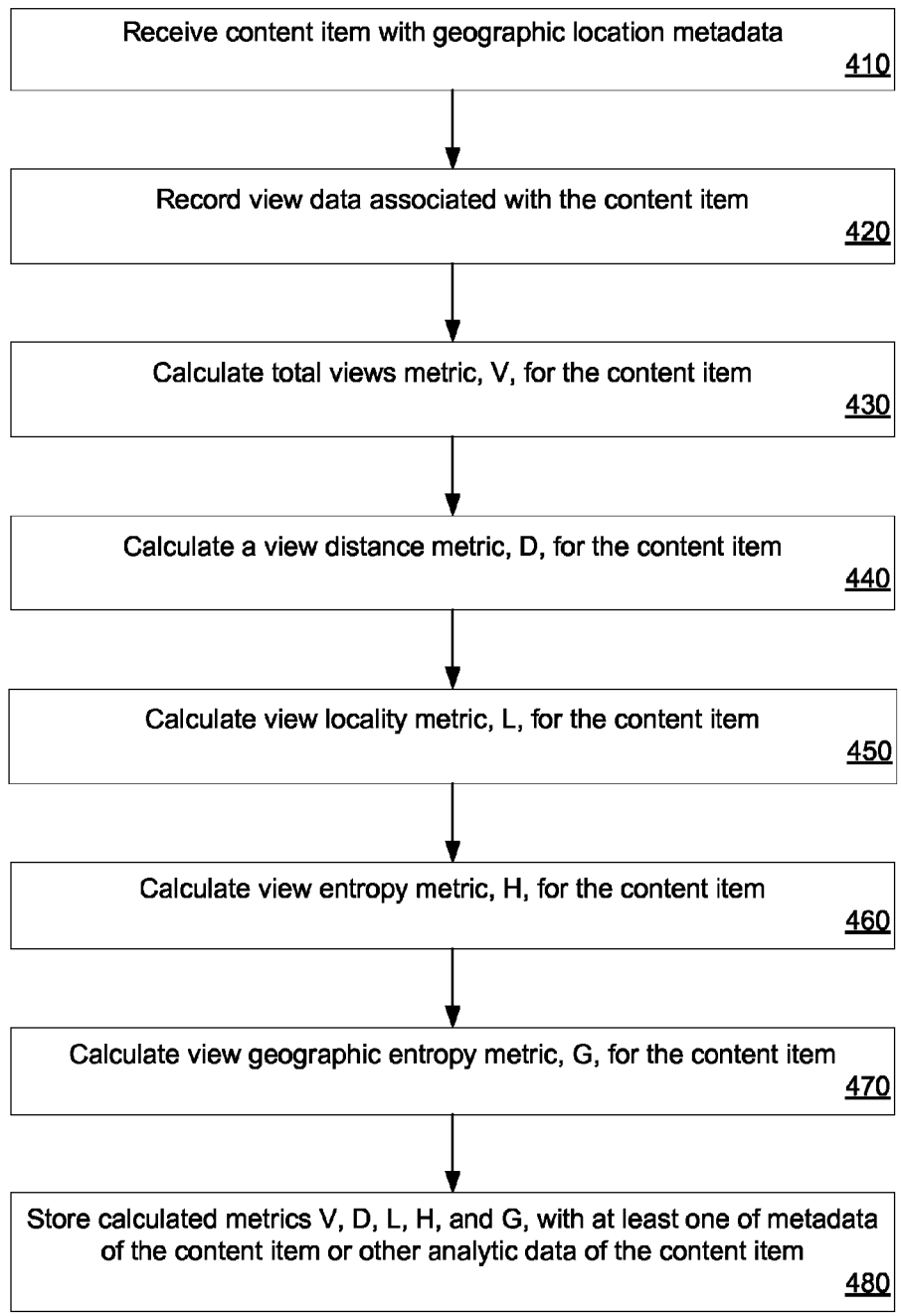
FIG. 4 is a flow diagram illustrating one embodiment for a method of tracking geographic popularity of geographically-located user-generated content.
Figure 6:
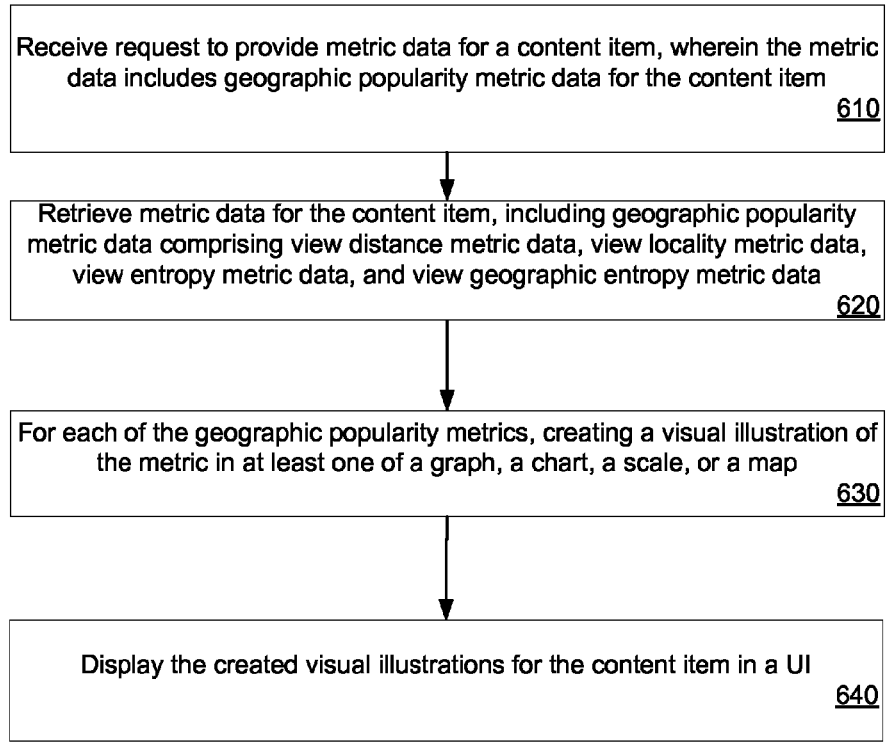
FIG. 6 is a flow diagram illustrating another embodiment for a method of displaying geographic popularity of geographically-located user-generated content.

FIGS. 4-6 are flow diagrams of various embodiments of methods for evaluating geographic popularity of geographically-located user-generated content. The methods are performed by processing logic that may comprise hardware (circuitry, dedicated logic, etc.), software (such as is run on a general purpose computer system or a dedicated machine), or a combination of both. In one embodiment, the methods of FIGS. 4-6 may be performed by analytic server 120 running on a server machine or another machine as described with respect to FIG. 1.

FIG. 4 is a flow diagram illustrating one embodiment for a method 400 of tracking geographic popularity of geographically-located user-generated content. At block 410 of method 400, a content item is received with geographic location metadata. In one embodiment, the content item is uploaded to a shared content hosting platform. The content item may be at least one of video, photos, music, documents, and so on. At block 420, view data associated with the content item is recorded. In some embodiments, the view data includes a time and date of a view, an IP address associated with the view, a duration of the view, and other view data as relevant to the type of content item. In one embodiment, the view history data may be stored with the metadata associated with the content item. In other embodiments, view history data for a content item is kept in storage separate from the content and its associated metadata.

Blocks 430 through 470 utilize the geographic location metadata and view history data identified in blocks 410 and 420 to calculate various geographic-related metrics. At block 430, a total views metric, V, is calculated for the content item. As described above, the total views metric, V, measures the total number of views of a content item. At block 440, a view distance metric, D, is calculated for the content item. The view distance metric, D, measures the average distance between the view locations and the item location, which illustrates generally how an item receives views from distant regions.

At block 450, a view locality metric, L, is calculated for the content item. The view locality metric, L, measures how the content item receives views from distant places by applying more weight to views coming from places nearby and less weight to views coming from distant regions. Subsequently, at block 460, a view entropy metric, H, is calculated for the content item. The view entropy metric, H, measures how views are spread across different regions without considering the content item's location. Lastly, at block 470, a view geographic entropy metric, G, is calculated for the content item. The view geographic entropy metric, G, measures how views are spread across different regions, while taking into account the geographic location of the content item.

Lastly, at block 480, the calculated metrics from block 430 through 470 are stored with at least one of the metadata of the content item or other analytic data of the content item. The other analytic data may include the view history data of the content item, for instance. Blocks 420-480 of method 400 may be periodically repeated throughout the lifetime of the content item. For example, these steps may be repeated on a daily basis or a weekly basis.

FIG. 5 is a flow diagram illustrating one embodiment for a method 500 of comparing geographic popularity of geographically-located user-generated content. At block 510 of method 500, a request is received to compare geographic popularity for a plurality of content items. The request further indicates one or more geographic regions to consider in this comparison. In some embodiments, the geographic areas may range from a region level (e.g., Asia-Pacific) to a country level (e.g., Australia) down to a local region (e.g., Silicon Valley) or a city level (e.g., Phoenix). In one embodiment, the request is received at a front-end server of a shared content hosting platform, and passed on to an analytic server of the platform for analysis services.

At block 520, view geographic entropy metric data is retrieved or accessed for all of the content items in the shared content hosting platform. In one embodiment, the view geographic entropy metric data had previously been calculated on a periodic basis for each content item stored at the platform. Subsequently, at block 530, each content item is ranked according to its view geographic entropy metric for each of the indicated geographic areas. Lastly, at block 540, the ranking results from block 530 are returned for display in a UI. In one embodiment, the results are returned to the front-end server for display to an end user via the UI.

FIG. 6 is a flow diagram illustrating one embodiment for a method 600 of displaying geographic popularity of geographically-located user-generated content. At block 610 of method 600, a request is received to provide metric data for a content item. The metric data includes geographic popularity metric data for the content item. In one embodiment, the request is received at a front-end server of a shared content hosting platform, and passed on to an analytic server of the platform for analysis services.

At block 620, metric data for the content item is retrieved, including the geographic popularity metric data comprising view distance metric data, view locality metric data, view entropy metric data, and view geographic entropy metric data. In one embodiment, the metric data had previously been calculated on a periodic basis for each content item stored at the platform. The metric data may be stored with metadata of the content item or separately with pre-aggregated analytic data.

At block 630, visual illustrations of each of the geographic popularity metrics are created in the form of at least one of a graph, a chart, a scale, or a map. In one embodiment, one of the visual illustrations is a scale that classifies the content item on a range running from 'Strongly Global' to 'Strongly Local'. Lastly, at block 640, the created visual illustrations are displayed for the content item in a UI. In one embodiment, the results are returned to the front-end server for display to an end user via the UI.

Figure 7:
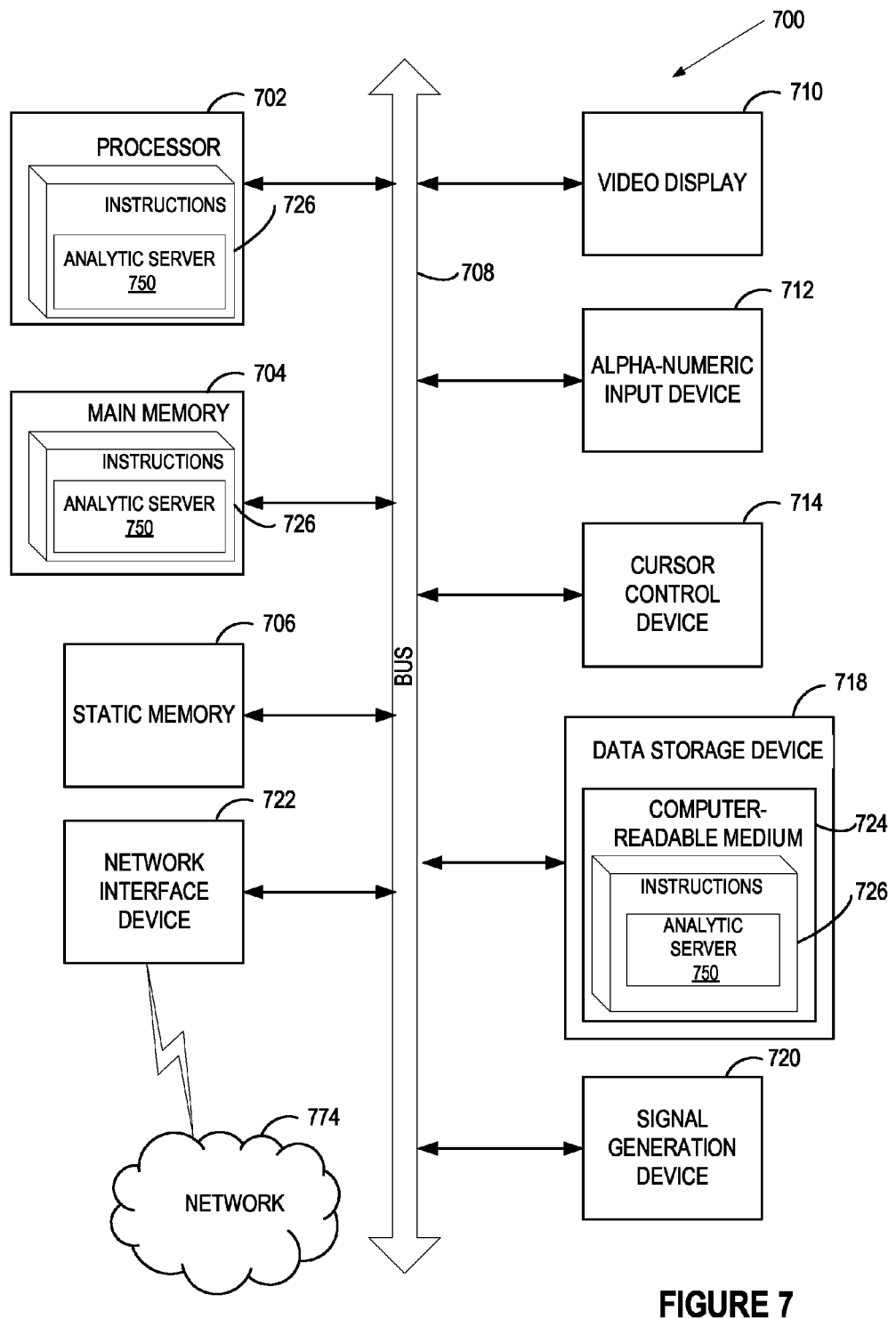
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein, illustrated in FIG. 7 by depicting instructions 726 within processor 702.

The computer system 700 may further include a network interface device 722. The computer system 700 also may include a video display unit 710 (e.g., a liquid crystal display (LCD), a cathode ray tube (CRT), or a touchscreen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for an analytic server 750, which may correspond to analytic server 120 of FIG. 1, and/or a software library containing methods that call an analytic server. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   receiving, by a computing device of a shared content hosting platform, a user-generated media content item having metadata indicating a geographic location of the user-generated media content item;
   determining, by the computing device, geographic location metadata associated with different instances of viewing the user-generated media content item, the geographic location metadata describing a geographic location of a user device viewing the user-generated media content item;
   calculating, by the computing device, a view geographic entropy of the user-generated media content item by distributing the determined geographic location metadata across multiple geographic regions while taking into account the geographic location of the user-generated media content item; and
   providing, by the computing device, the calculated view geographic entropy of the user-generated media content item for presentation in a visual display that is part of an analytical report of the user-generated media content item.

2. The method of claim 1, wherein the metadata indicating the geographic location of the user-generated media content item is provided by a user that uploads the user-generated media content item.

3. The method of claim 1, wherein the view geographic entropy of the user-generated media content item is equal to $-\Sigma_i (v_i/V) \log (v_i/(V*d_i))$, where $v_i$ is a number of views received in a particular region i, V is a total number of views for the user-generated media content item overall, and $d_i$ is a distance between the geographic location of the user-generated media content item and a location of a geographic region associated with the number of views in $v_i$.

4. The method of claim 1, further comprising calculating a view entropy of the user-generated media content item by measuring how the determined geographic location metadata is spread across different geographic regions without considering the geographic location of the content item.

5. The method of claim 4, further comprising depicting the view entropy in another visual illustration that is part of the analytical report of the user-generated media content item.

6. The method of claim 1, further comprising comparing the view geographic entropy of the user-generated media content item with view geographic entropies of one or more other user-generated media content items within a pre-determined distance of the user-generated media content item.

7. The method of claim 6, further comprising providing the comparison of the view geographic entropies of the content item and the one or more other user-generated media content items as a ranking with the largest view geographic entropy ranked first.

8. The method of claim 1, further comprising classifying, based on the view geographic entropy of the user-generated media content item, the user-generated media content item on a scale that ranges from a highly global content item to a highly local content item, where highly global indicates the user-generated media content item has a consistent popularity through multiple geographic regions and highly local indicates the user-generated media content item has a high popularity in a single geographic region.

9. A non-transitory computer readable storage medium having instructions that, when executed by a processing device, cause the processing device to perform operations comprising:
   receiving, by a computing device of a shared content hosting platform, a user-generated media content item having metadata indicating a geographic location of the user-generated media content item;
   determining, by the computing device, geographic location metadata associated with different instances of viewing the user-generated media content item, the geographic location metadata describing a geographic location of a user device viewing the user-generated media content item;
   calculating, by the computing device, a view geographic entropy of the user-generated media content item by distributing the determined geographic location metadata across multiple geographic regions while taking into account the geographic location of the user-generated media content item; and
   providing, by the computing device, the calculated view geographic entropy of the user-generated media content item for presentation in a visual display that is part of an analytical report of the user-generated media content item.

10. The non-transitory computer readable storage medium of claim 9, wherein the metadata indicating the geographic location of the user-generated media content item is provided by a user that uploads the user-generated media content item.

11. The non-transitory computer readable storage medium of claim 9, wherein the view geographic entropy of the user-generated media content item is equal to $-\Sigma_i (v_i/V) \log (v_i/(V*d_i))$, where $v_i$ is a number of views received in a particular region i, V is a total number of views for the user-generated media content item overall, and $d_i$ is a distance between the geographic location of the user-generated media content item and a location of a geographic region associated with the number of views in $v_i$.

12. The non-transitory computer readable storage medium of claim 9, wherein the instructions, when executed by the processing device, cause the processing device to perform further operations comprising calculating a view entropy of the user-generated media content item by measuring how the determined geographic location metadata is spread across different geographic regions without considering the geographic location of the content item.

13. The non-transitory computer readable storage medium of claim 9, wherein the instructions, when executed by the processing device, cause the processing device to perform further operations comprising comparing the view geographic entropy of the user-generated media content item with view geographic entropies of one or more other user-generated media content items within a pre-determined distance of the user-generated media content item.

14. The non-transitory computer readable storage medium of claim 13, wherein the instructions, when executed by the processing device, cause the processing device to perform further operations comprising providing the comparison of the view geographic entropies of the user-generated media content item and the one or more user-generated media other content items as a ranking with the largest view geographic entropy ranked first.

15. The non-transitory computer readable storage medium of claim 9, wherein the instructions, when executed by the processing device, cause the processing device to perform further operations comprising classifying, based on the view geographic entropy of the content item, the user-generated media content item on a scale that ranges from a highly global content item to a highly local content item, where highly global indicates the user-generated media content item has a consistent popularity through multiple geographic regions and highly local indicates the user-generated media content item has a high popularity in a single geographic region.

16. A computing device of a shared content hosting platform comprising:
 a memory to store metadata for a plurality of user-generated media content items and view history data for the plurality of user-generated media content items; and
 a processing device coupled to the memory, wherein the processing device is configured to:
  retrieve metadata associated with a user-generated media content item of the plurality of user-generated media content items from the memory, the metadata indicating a geographic location of the user-generated media content item;
  retrieve, from the memory, geographic location metadata associated with different instances of viewing the user-generated media content item via the shared content hosting platform, the geographical location metadata part of the view history data and comprising information describing a geographic location of a user device viewing the user-generated media content item;
  calculate a view geographic entropy of the user-generated media content item by distributing the determined geographic location metadata across multiple geographic regions while taking into account the geographic location of the user-generated media content item; and
  provide the calculated view geographic entropy of the user-generated media content item for presentation in a visual display that is part of an analytical report of the user-generated media content item.

17. The computing device of claim 16, wherein the view geographic entropy of the user-generated media content item is equal to $-\Sigma_i (v_i/N) \log (v_i/(V^*d_i))$, where $v_i$ is a number of views received in a particular region i, V is a total number of views for the user-generated media content item overall, and $d_i$ is a distance between the geographic location of the user-generated media content item and a location of a geographic region associated with the number of views in $v_i$.

18. The computing device of claim 16, wherein the processing device is further configured to compare the view geographic entropy of the user-generated media content item with view geographic entropies of one or more other user-generated media content items within a pre-determined distance of the user-generated media content item.

19. The computing device of claim 18, wherein the processing device is further configured to provide the comparison of the view geographic entropies of the user-generated media content item and the one or more other user-generated media content items as a ranking with the largest view geographic entropy ranked first.

20. The computing device of claim 16, wherein the processing device is further configured to classify, based on the view geographic entropy of the user-generated media content item, the user-generated media content item on a scale that ranges from a highly global content item to a highly local content item, where highly global indicates the user-generated media content item has a consistent popularity through multiple geographic regions and highly local indicates the user-generated media content item has a high popularity in a single geographic region.

* * * * *